United States Patent [19]

Sabol et al.

[11] Patent Number: 4,649,023

[45] Date of Patent: Mar. 10, 1987

[54] PROCESS FOR FABRICATING A ZIRCONIUM-NIOBIUM ALLOY AND ARTICLES RESULTING THEREFROM

[75] Inventors: George P. Sabol, Murrysville Boro; Samuel G. McDonald, III, Monroeville, both of Pa.

[73] Assignee: Westinghouse Electric Corp., Pittsburgh, Pa.

[21] Appl. No.: 693,547

[22] Filed: Jan. 22, 1985

[51] Int. Cl.4 .............................................. C22C 16/00
[52] U.S. Cl. .............................. 420/422; 148/11.5 F; 148/407; 148/421
[58] Field of Search ....................... 148/11.5 F, 12.7 B, 148/407, 421; 420/422

[56] References Cited

U.S. PATENT DOCUMENTS

| | | | |
|---|---|---|---|
| 2,894,866 | 7/1959 | Picklesimer | 148/11.5 F |
| 3,005,706 | 10/1961 | Thomas et al. | 148/421 |
| 3,121,034 | 2/1964 | Anderko | 148/11.5 F |
| 3,266,950 | 8/1966 | Zwicker | 148/11.5 F |
| 3,341,373 | 9/1967 | Evans et al. | 148/11.5 F |
| 3,567,522 | 3/1971 | Thomas et al. | 148/11.5 F |
| 3,575,806 | 4/1971 | Boulton | 376/305 |
| 3,645,800 | 2/1972 | Mock et al. | 148/11.5 F |
| 3,689,324 | 9/1972 | Weiner et al. | 148/11.5 F |
| 3,826,124 | 7/1974 | Baksay | 148/11.5 F |
| 3,865,635 | 2/1975 | Hofvenstam et al. | 148/11.5 F |
| 3,884,728 | 5/1975 | Levy | 148/11.5 F |
| 3,963,534 | 6/1976 | Frenkel et al. | 148/133 |
| 4,000,013 | 12/1976 | MacEwen et al. | 148/11.5 F |
| 4,065,328 | 12/1977 | Cheadle | 148/12.7 B |
| 4,094,706 | 6/1978 | Schulson et al. | 148/11.5 F |
| 4,108,687 | 8/1978 | Armand et al. | 148/11.5 F |
| 4,169,743 | 10/1979 | Lee | 148/133 |
| 4,212,686 | 7/1980 | Lunde et al. | 148/11.5 F |
| 4,226,647 | 10/1980 | Schulson et al. | 148/133 |
| 4,238,251 | 12/1980 | Williams et al. | 148/133 |
| 4,450,016 | 5/1984 | Vesterlund et al. | 148/11.5 F |
| 4,450,020 | 5/1984 | Vesterlund | 148/11.5 F |

FOREIGN PATENT DOCUMENTS

| | | | |
|---|---|---|---|
| 252518 | 5/1963 | Australia . | |
| 71193 | 2/1983 | European Pat. Off. | 148/11.5 F |
| 85553 | 8/1983 | European Pat. Off. | 148/11.5 F |
| 210961 | 12/1982 | Japan | 148/11.5 F |
| 22365 | 2/1983 | Japan | 148/11.5 F |
| 22366 | 2/1983 | Japan | 148/11.5 F |
| 2079317 | 1/1982 | United Kingdom | 148/421 |

OTHER PUBLICATIONS

Cheadle et al., "Development of Texture and Structure in ZR-2.5 wt % Nb Extruded Tube", Canadian Metallurgical Quarterly, vol. 11, No. 1, 1972, pp. 121–127.
Castaldelli et al., "Long-Term Test Results of Promising New Zirconium Alloys", Zirconium in the Nuclear Industry, 5th Conference, ASTM STP 754, 1982, pp. 105–126.

Primary Examiner—L. Dewayne Rutledge
Assistant Examiner—Robert L. McDowell
Attorney, Agent, or Firm—John J. Prizzi

[57] ABSTRACT

Articles, such as tubing, which have excellent corrosion resistance to steam at elevated temperatures and to hydriding, are produced from zirconium alloys containing 0.5 to 2.0 percent niobium, up to 1.5 percent tin, and up to 0.25 percent of a third alloying element such as iron, chromium, molybdenum, vanadium, copper, nickel and tungsten. The articles are formed by beta-treating the alloy, initially deforming the same at a temperature below 650° C. and further deforming the same through cold working stages also below 650° C., annealing the material between the cold working stages at a temperature between 500°–650° C., and final annealing the same at a temperature below 650° C. to provide articles having a microstructure of fine precipitates of less than about 800 Å, homogeneously dispersed throughout the zirconium.

24 Claims, 9 Drawing Figures

PROCESS FOR FABRICATING A ZIRCONIUM-NIOBIUM ALLOY AND ARTICLES RESULTING THEREFROM

CROSS-REFERENCE TO RELATED INVENTIONS

A process for fabricating products from Zircaloy alloys, and the resultant products having high temperature aqueous environment corrosion resistance, are described in a related application of the present inventors, application Ser. No. 571,122 filed on Jan. 13, 1984 which is a continuation of application Ser. No. 343,787, filed Jan. 29, 1982 assigned to the assignee of the present invention. This related application describes a process where Zircaloy alloy material is beta-treated and subsequently cold worked, with annealing temperatures of about 500° to 600° C. used between cold working steps, to produce a product having a microstructure adjacent a surface of an article having a substantially random distribution of reduced size precipitates.

A process for fabricating thin-walled tubing from zirconium alloys containing 1–2.5 percent by weight niobium, and resulting products having corrosion resistance, are described in a related application of the present inventors, application Ser. No. 693,546, filed on even date herewith assigned to the assignee of the present invention. That related application describes a process where zirconium-niobium alloys are treated to produce thin-walled tubing resistant to high temperature aqueous environments, preferably for use in nuclear reactor components.

BACKGROUND OF THE INVENTION

The present process relates to fabrication of articles, either as intermediate or final products, from a zirconium alloy containing, in addition to zirconium, between about 0.5 to 2.0 percent by weight of niobium, up to about 1.5 percent by weight tin, and a minor amount, up to about 0.25 percent by weight of a third element such as iron, chromium, molybdenum, vanadium, copper, nickel and tungsten. The resultant products, produced according to the present invention, have a particular microstructure that enables the material to resist corrosion in high temperature steam environments.

In the development of nuclear reactors, such as pressurized water reactors and boiling water reactors, fuel designs impose significantly increased demands on all of the core components, such as cladding, grids, guide tubes, and the like. Such components are conventionally fabricated from the zirconium-based alloys, Zircaloy-2 and Zircaloy-4. Increased demands on such components will be in the form of longer required residence times and thinner structural members, both of which cause potential corrosion and/or hydriding problems. These increased demands have prompted the development of alloys that have improved corrosion and hydriding resistance, as well as fabricability and mechanical properties that are typical of the conventional Zircaloys. One such class of materials are the zirconium alloys containing zirconium, niobium, tin, and a third element, such as a zirconium alloy containing 1 percent by weight niobium, 1 percent by weight tin, and at least 0.15 percent by weight iron. The only technical limitation which could prevent the utilization of these alloys is that they ordinarily exhibit optimum corrosion and hydriding resistance only after they have been rapidly quenched from high temperatures in the beta-treatment range (~850°–950° C.) and then aged for long time periods such as 8–24 hours at about 500°–600° C. This type of treatment cannot readily be applied to any of the required core components, and thus the usefulness of these alloys is severely limited.

SUMMARY OF THE INVENTION

Intermediate and final products are formed from a zirconium-niobium alloy containing 0.5 to 2.0 percent niobium, up to 1.5 percent tin and up to about 0.25 percent of a third alloying element, such as iron, the article having excellent corrosion resistance to aqueous environments at elevated temperatures, and hydriding resistance.

The alloys are beta-quenched and subsequently treated at lower than normal annealing temperatures and fabricating steps. In formation of tubing, for example, the beta-quenched alloy is extruded at a temperature at or below 650° C. and between subsequent cold working steps, the article is subjected to cold working anneals at a temperature at or below 650° C. The resultant article is given a final anneal at a temperature also below 650° C., and preferably around 500° C. The resultant alloy articles have a microstructure that comprises fine precipitates, less than 800 Å, homogeneously dispersed throughout the matrix.

These and other aspects of the present invention will become apparent when read in conjunction with the following description and the drawings, in which:

DETAILED DESCRIPTION

The fabrication of intermediate and final products from a zirconium-niobium-tin alloy containing a minor amount of a third alloying element is effected according to the present invention with the production of resultant articles that exhibit excellent corrosion resistance and resistance to hydride formations.

The alloys that are the subject of the present process are zirconium alloys which contain, in percentages by weight, 0.5 to 2.0 percent niobium, up to 1.5 percent tin, and up to about 0.25 percent of a third alloying element such as iron, chromium, molybdenum, vanadium, copper, nickel and tungsten. While tin and the third alloying element are present in an amount up to the percentages by weight listed, the minimum amount present would be that sufficient to give the desired corrosion resistance in the articles produced therefrom. Preferably the alloy contains about 1 percent by weight niobium and about 1 percent by weight tin. It is also preferred that the level of the third alloying element be about 0.1 weight percent. A particularly useful alloy has been found to be a zirconium alloy containing 1 percent by weight niobium, 1 percent by weight tin, and 0.1 percent by weight iron.

The present invention produces articles of the zirconium alloy wherein the alloying elements are homogeneously dispersed throughout the zirconium in a finely divided state. The particles, homogeneously dispersed, are of an average particle size below 800 angstroms (Å), and preferably the particle size is below about 500 angstroms.

The alloys of the present invention are first subjected to a beta-treatment by heating the alloy to about 950°–1000° C. and water-quenching the same to a temperature below the alpha+beta to alpha transus temperature. In formation of tubing, to which the following description is directed, the billet is then prepared for extrusion by drilling an axial hole along the center line of the billet, machining the outside diameter to desired dimensions, and applying a lubricant to the surfaces of the billet. The billet diameter is then reduced by extrusion at a lower than conventional temperature, below about 700° C., through a frustoconical die and over a mandrel. A beta-anneal of the extruded tube shell may then be effected, depending upon the alloy, by heating to about 850°–1050° C., followed by rapid cooling. The billet may then be cold worked by pilgering, at a source of primary fabrication, to reduce the wall thickness and outside diameter. This intermediate production is called a TREX (Tube Reduced Extrusion), which may then be sent to a tube mill for fabrication by cold working, intermediate low temperature annealing, and a final anneal under the fabricating steps of the present invention to produce tubing.

Figure 1:
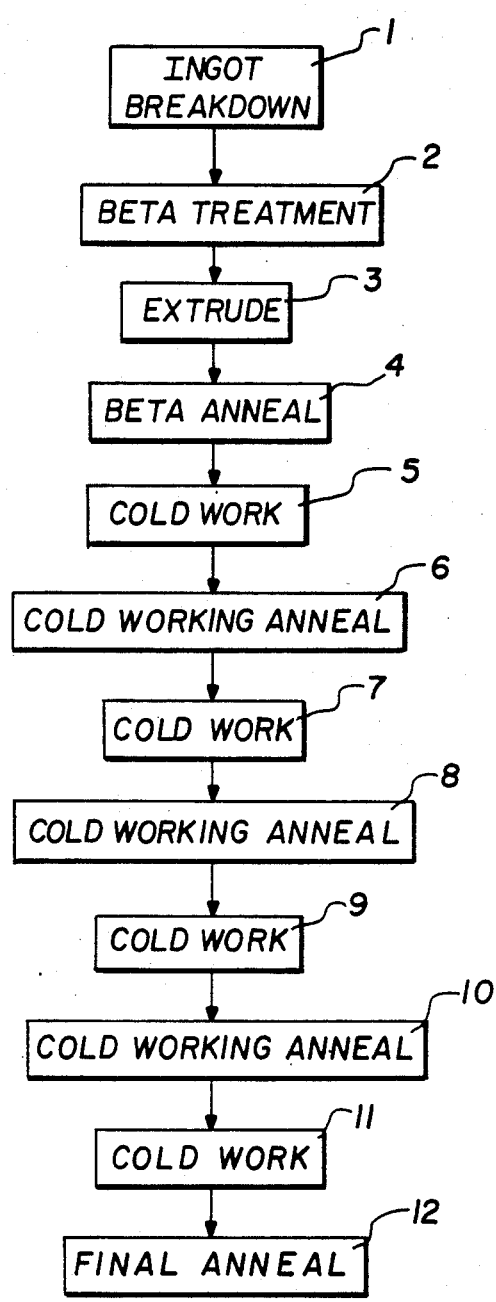
FIG. 1 is a process flow diagram of an embodiment of the present invention.

In accordance with the present process, a zirconium alloy was processed into thin-walled tubular cladding, as illustrated in the process outline flow diagram of FIG. 1, from a zirconium alloy containing, by weight, 1 percent niobium, 1 percent tin, and 0.1 percent iron, with the balance being zirconium. A zirconium alloy ingot, of the composition given in Table IV, was broken down by conventional treatment and beta-forged from a twelve inch diameter to about six inch diameter billet (Step 1). The six inch billet was beta-treated (Step 2) by holding the ingot in a furnace at about 968°–996° C. (1775°–1825° F.) for a period of fifteen minutes and then water-quenching the billet. At this point, the beta-treated billet was machined, bore-holed, and inspected in preparation for extrusion. The hollow zirconium alloy billet was then heated to about 649° C. (1200° F.) and extruded (Step 3) to a hollow tube having an outside diameter of 2.5 inches and a wall thickness of 0.43 inch.

The extruded hollow tube was beta annealed (Step 4) at 954° C. (1750° F.) for a period of fifteen minutes in preparation for the first cold working step.

The beta-annealed extrusion was pilgered in Step 5 to a TREX having an outside diameter of 1.75 inches and a wall thickness of 0.3 inch. The TREX was then subjected to a cold working anneal (Step 6) for an 8 hour period at 600° C. (1112° F.). Following the cold working anneal of the TREX, the same was cold pilgered (Step 7) to a tube shell having an outside diameter of 1.25 inch and a wall thickness of 0.2 inch. The tube shell was subjected to another cold working anneal (Step 8) at about 580° C. (1076° F.) for 8 hours. The annealed tube shell was again cold pilgered (Step 9) to a tube shell having an outside diameter of 0.70 inch and a wall thickness of 0.07 inch. A further cold working anneal (Step 10) was effected on the tube shell for 8 hours at about 580° C. (1076° F.). A third pilgering of the tube shell was effected, (Step 11) to produce a tube having an outside diameter of 0.423 inch and a wall thickness of 0.025 inch. This tube was then subjected to a final anneal (Step 12) for a period of 7.5 hours at about 480° C. (896° F.).

Nuclear fuel cladding produced according to the present process was subjected to out-reactor and in-reactor performance tests and illustrate corrosion resistance and hydriding resistance significantly superior to that of Zircaloy-4 nuclear fuel cladding.

Stress relieved sections of tubing prepared according to the present process were corrosion tested in a static autoclave in 316° C. (10.6 MPa) water, 360° C. (18.6 MPa) water and 427° C. (10.3 MPa) steam, with corrosion rate and hydriding data compared with Zircaloy-4. The results of the tests are listed in Table I (corrosion) and Table II (hydriding):

TABLE I

Linear Out-of-Pile Post-Transition Corrosion Rates Exhibited by the Zr—1.0 Nb—1.0 Sn—0.1 Fe Alloy and Reference Zircaloy-4 Fuel Claddings

| Alloy | Temperature (°C.) | Corrosion Rate (mg/dm$^2$/day) |
|---|---|---|
| Zr—Nb—Sn—Fe | 316 | 0.09 |
| " | 360 | 0.33 |
| " | 427 | 2.48 |
| Zircaloy-4 | 316 | 0.10 |
| " | 360 | 0.57 |
| " | 427 | 6.05 |

TABLE II

Out-of-Pile Hydrogen Pickup Rates Exhibited by the Zr—1.0 Nb—1.0 Sn—0.1 Fe Alloy and Reference Zircaloy-4 Fuel Claddings

| Alloy | Temperature (°C.) | % of Theoretical* | Hydriding Rate (mg/dm$^2$/day) |
|---|---|---|---|
| Zr—Nb—Sn—Fe | 316 | 4.4 ± 2.2 | 0.6 |
| " | 360 | 6.2 ± 2.2 | 2.3 |
| " | 427 | 27.7 ± 5.8 | 79.5 |
| Zircaloy-4 | 316 | 12.2 ± 9.0 | 2.2 |
| " | 360 | 12.7 ± 4.4 | 8.6 |
| " | 427 | 51.6 ± 13.1 | 122.4 |

*$\bar{x}\pm$

Inspection of the above tables reveal that the Zr-Nb-Sn-Fe fuel cladding of the present invention exhibits lower thermal post-transition corrosion rates at all three temperatures, and hydrogen pickup rates that are a factor of 3–4 lower than that of Zircaloy-4.

Fuel rods using cladding fabricated according to the present invention were irradiated in the BR-3 pressurized water reactor located in Mol, Belgium. Post-irradiation examinations (PIE) performed after one cycle exposure indicate in-reactor corrosion performance superior to Zircaloy-4, consistent with the out-of-pile results. A comparison of the results is listed in Table III:

TABLE III

Oxide Thicknesses Measured on BR-3 Fuel Rods After One Irradiation Cycle (7.5 months exposure)

| Alloy | Elevation (mm) | Oxide Thickness (μm) | Mean (μm) |
|---|---|---|---|
| Zr—Nb—Sn—Fe | 81 | 2.56 | |
| " | 287 | 3.55 | |
| " | 467 | 3.97 | 3.468 |
| " | 666 | 3.96 | |
| " | 848 | 3.30 | |
| Zircaloy-4 | 81 | 2.63 | |

TABLE III-continued

Oxide Thicknesses Measured on BR-3 Fuel Rods
After One Irradiation Cycle (7.5 months exposure)

| Alloy | Elevation (mm) | Oxide Thickness (μm) | Mean (μm) |
|---|---|---|---|
| " | 272 | 4.00 | |
| " | 416 | 4.23 | |
| " | 675 | 4.22 | 3.656 |
| " | 869 | 3.20 | |

Figure 2A:
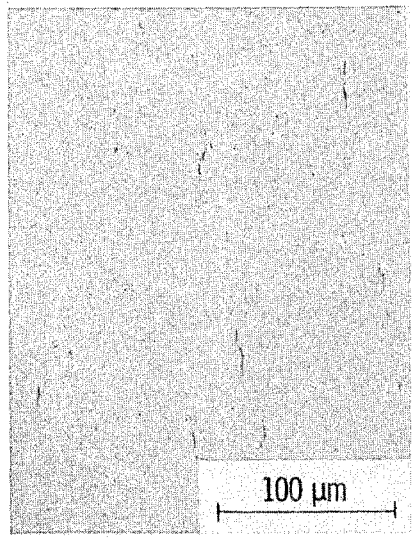
FIGS. 2A, B, C and D show transmission electron microscopy photomicrographs illustrating the typical precipitate distribution and size observed in a stress-relief-annealed tubing produced according to the present process.
Figure 2B:
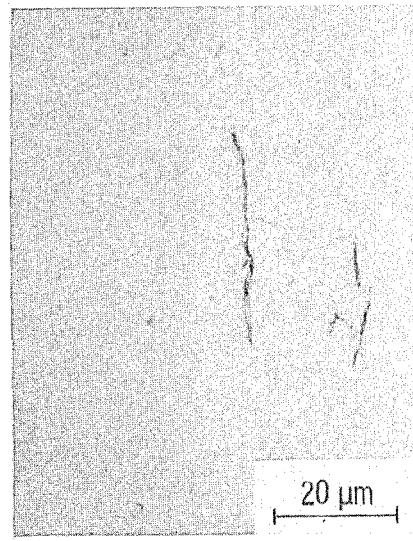
Figure 2C:
Figure 2D:
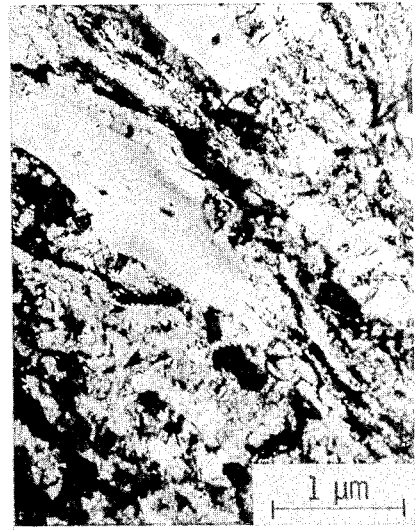
Figure 3A:
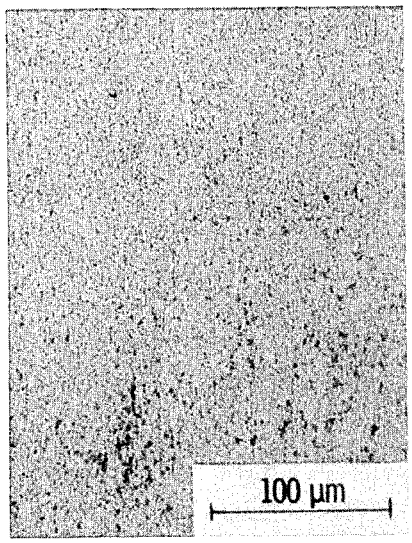
FIGS. 3A, B, C and D show transmission electron microscopy photomicrographs illustrating the typical precipitate distribution and size observed in a fully annealed tubing produced according to the present process.
Figure 3B:
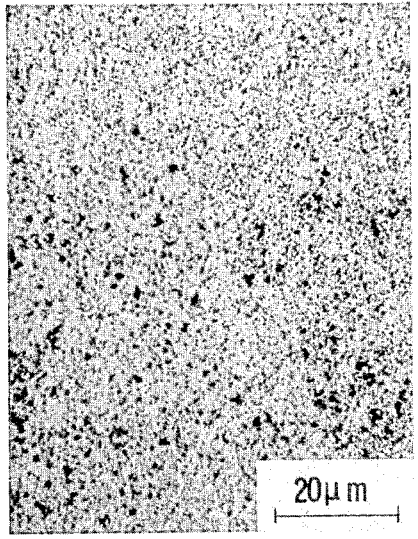
Figure 3C:
Figure 3D:
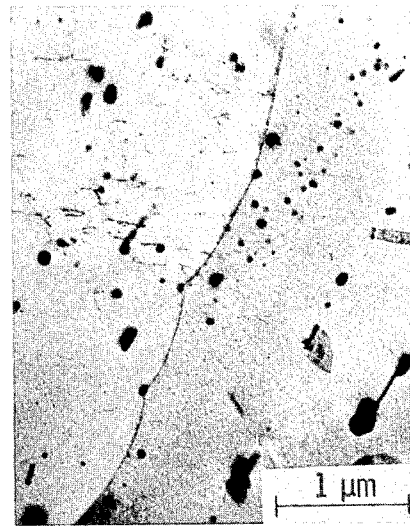

The present process provides uniform distribution of very fine precipitate particles in the microstructure of the alloy. The microstructure of a zirconium alloy tubing containing 1.0 percent niobium, 1.0 percent tin and 0.1 percent iron that has been stress-relief-annealed with a final anneal of 7.5 hours at 480° C. (896° F.) is illustrated in FIGS. 2A, B, C and D. FIGS. 3A, B, C and D show the microstructure of a tubing, of the same alloy of FIG. 2, that has been fully annealed at about 590° C. (1094° F.) for an 8 hour period.

In fully annealed tubing produced according to the present invention, formed from a zirconium alloy containing 1.0 percent niobium, 1.0 percent tin and 0.1 percent iron, which was fully annealed for 8 hours at 600° C. (1112° F.), the average particle size of the precipitates was 330 Å in average diameter, with a number density of $4 \times 10^{14}/cm^3$. This precipitate size represents a relatively fine dispersion, especially when compared to an average diameter of 3000 Å for particle sizes in a conventionally processed Zircaloy-4 alloy.

While the advantages of the present invention have been described in connection with a zirconium alloy containing 1 percent niobium, 1 percent tin, and 0.1 percent iron, in fabricating a thin-walled tubing, having a wall thickness less than about 0.04 inch, for use as a fuel cladding, it is believed that the present invention is also applicable to other alloys as hereinbefore defined and to fabrication of other articles such as sheet material or plates. The present invention is thus believed to be applicable to zirconium alloys containing niobium, tin and iron in other percentages by weight as aforedescribed and to zirconium alloys containing niobium, tin and other third alloying elements, such as chromium, molybdenum vanadium, copper, nickel and tungsten, in substitution for or in addition to iron, with total third alloying element being in an amount of less than about 0.25 percent by weight.

In the formation of sheet material or plates according to the present process, the rolling temperature is reduced to about 650° C. or less, with a number of hot rolling passes made below that temperature as needed, with a final anneal also below that temperature to provide articles with the homogeneously dispersed precipitates of less than about 800 angstroms throughout the material.

TABLE IV

Ingot Chemistry of Zirconium Alloy Containing 1 Weight Percent Niobium, 1 Weight Percent Tin, and 0.1 Weight Percent Iron, Processed in Accordance with the Invention

| | Spec. | Top of Ingot | Bottom of Ingot |
|---|---|---|---|
| Nb | 0.9–1.1 | 1.01 | 0.96 |
| Sn | 0.9–1.1 | 0.97 | 0.94 |
| Fe | 0.09–0.11 | 0.10 | 0.09 |
| O | 1000–1600 ppm | 1370 | 1490 |
| Zr | | BALANCE | |
| Al | 75 | <35 | <35 |
| B | 0.5 | <0.2 | <0.2 |
| Cd | 0.5 | <0.2 | <0.2 |
| C | 120 | 60 | 70 |
| Cl | 20 | <5 | <5 |
| Co | 20 | <10 | <10 |
| Cu | 50 | <25 | <25 |
| Cr | 50 | <50 | <50 |
| H | 20 | 5 | 6 |
| Hf | 75 | 40 | 39 |
| Pb | 50 | <50 | <50 |
| Mn | 50 | <25 | <25 |
| N | 50 | 29 | 28 |
| Ni | 50 | <35 | <35 |
| Si | 80 | <50 | <50 |
| Ti | 50 | <40 | <40 |
| W | 100 | <25 | <25 |
| $U_T$ | 3.5 | 0.5 | |
| U-235 | 0.025 | 0.0045 | |

What is claimed is:

1. An article of manufacture for use in the elevated temperature aqueous environment of a water reactor, said article comprising:
   a zirconium alloy composing said article and consisting essentially of:
      0.5 to 2.0 weight percent niobium,
      0.9 to 1.5 weight percent tin,
      0.09 to 0.11 weight percent of a third alloying element selected from the group consisting of iron, chromium, molybdenum, vanadium, copper, nickel and tungsten,
   and the balance of said alloy essentially zirconium;
   a microstructure of precipitates homogeneously dispersed throughout the matrix of said zirconium alloy, said precipitates having an average particle size below 800 angstroms;
   said article and said microstructure produced by a process comprising the steps of:
      beta treating a billet of said alloy;
      initially deforming said beta-treated billet at a temperature below 650° C., then further deforming said beta-treated billet through cold working stages at a temperature below about 650° C.;
      then annealing said alloy between said cold working stages at a temperature of between about 500°–650° C.;
      and finally annealing said alloy at a temperature below about 650° C.

2. The article according to claim 1 wherein said zirconium alloy further consists essentially of 1000 to 1600 ppm oxygen.

3. The article according to claim 1 wherein said zirconium alloy contains 0.9 to 2.0 weight percent niobium.

4. The article according to claim 3 wherein said zirconium alloy further consists essentially of 1000 to 1600 ppm oxygen.

5. The article according to claim 1 wherein said zirconium alloy contains 0.9 to 1.1 weight present tin.

6. The article according to claim 1 wherein said third alloying element is iron.

7. The article according to claim 5 wherein said third alloying element is iron.

8. The article according to claim 1 wherein said zirconium alloy contains 0.9 to 1.1 weight percent niobium.

9. The article according to claim 7 wherein said zirconium alloy contains 0.9 to 1.1 weight percent niobium.

10. The article according to claim 9 wherein said zirconium alloy further consists essentially of 1000 to 1600 ppm oxygen.

11. The article according to claim 1 wherein said average particle size is below abut 500 angstroms.

12. The article according to claim 9 wherein said average particle size is below about 500 angstroms.

13. An article of manufacture for use in the elevated temperature aqueous environment of a water reactor, said article comprising:
a zirconium alloy comprising said article and consisting essentially of:
0.5 to 2.0 weight percent niobium,
0.9 to 1.5 weight percent tin,
0.09 to 0.11 weight percent of a third alloying element selected from the group consisting of iron, chromium, molybdenum, vanadium, copper, nickel and tungsten,
and the balance of said alloy essentially zirconium;
a microstructure of precipitates homogeneously dispersed throughout the matrix of said zirconium alloy, said precipitates having an average particle size below 800 angstroms.

14. The article according to claim 13 wherein said zirconium alloy further consists essentially of 1000 to 1600 ppm oxygen.

15. The article according to claim 13 wherein said zirconium alloy contains 0.9 to 2.0 weight percent niobium.

16. The article according to claim 15 wherein said zirconium alloy further consists essentially of 1000 to 1600 ppm oxygen.

17. The article according to claim 13 wherein said zirconium alloy contains 0.9 to 1.1 weight percent tin.

18. The article according to claim 13 wherein said third alloying element is iron.

19. The article according to claim 17 wherein said third alloying element is iron.

20. The article according to claim 13 wherein said zirconium alloy contains 0.9 to 1.1 weight percent niobium.

21. The article according to claim 19 wherein said zirconium alloy contains 0.9 to 1.1 weight percent niobium.

22. The article according to claim 21 wherein said zirconium alloy further consists essentially of 1000 to 1600 ppm oxygen.

23. The article according to claim 13 wherein said average particle size is below abut 500 angstroms.

24. The article according to claim 21 wherein said average particle size is below about 500 angstroms.

* * * * *